US010375747B2

(12) United States Patent
Sang et al.

(10) Patent No.: US 10,375,747 B2
(45) Date of Patent: Aug. 6, 2019

(54) SYSTEM AND METHOD FOR EFFICIENT CONNECTION SETUP AND COMMUNICATION FOR POWER CONSCIOUS DEVICES

(71) Applicant: Futurewei Technologies, Inc., Plano, TX (US)

(72) Inventors: Aimin Justin Sang, San Diego, CA (US); Nathan Edward Tenny, Poway, CA (US); Jian Wang, Beijing (CN); Bo Lin, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/376,133

(22) Filed: Dec. 12, 2016

(65) Prior Publication Data
US 2018/0049256 A1  Feb. 15, 2018

Related U.S. Application Data (60) Provisional application No. 62/374,640, filed on Aug. 12, 2016.

(51) Int. Cl.
*H04W 76/00* (2018.01)
*H04W 76/14* (2018.01)
(Continued)

(52) U.S. Cl.
CPC ............. *H04W 76/14* (2018.02); *H04W 4/80* (2018.02); *H04W 8/005* (2013.01); *H04W 48/08* (2013.01);
(Continued)

(58) Field of Classification Search
CPC ....... H04W 76/14; H04W 76/15; H04W 4/80; H04W 8/005; H04W 48/08; H04W 48/18;
(Continued)

(56) References Cited

U.S. PATENT DOCUMENTS

2008/0170551 A1* 7/2008 Zaks ................. H04W 52/0229
                                                370/338
2008/0310378 A1* 12/2008 Kitazoe ................ H04W 76/10
                                                370/338
(Continued)

FOREIGN PATENT DOCUMENTS

CN  102550086 A  7/2012
CN  103688590 A  3/2014
(Continued)

OTHER PUBLICATIONS

"Specification of the Bluetooth System, Experience More", Version 4.0, vols. 0-6, Jun. 30, 2010, 2302 pages.
(Continued)

Primary Examiner — Khai M Nguyen
(74) Attorney, Agent, or Firm — Slater Matsil, LLP (57) ABSTRACT

A method for establishing a radio connection includes selecting a first radio access technology for a first phase of a multi-phase radio connection establishment process to minimize power consumption at a remote device, and participating in the first phase of the multi-phase radio connection establishment process. The method also enables establishing and using a radio connection with the first radio access technology that is selected independently from a selection of a second radio access technology used in a second phase of the multi-phase radio connection establishment process, wherein the second phase may be relayed or direct data communications over the established connection in the first phase between the wearable device and its peer (relay) devices or network equipment.

22 Claims, 8 Drawing Sheets (51) Int. Cl.
*H04W 76/15* (2018.01)
*H04W 4/80* (2018.01)
*H04W 8/00* (2009.01)
*H04W 48/08* (2009.01)
*H04W 52/02* (2009.01)
*H04W 48/18* (2009.01)
*H04W 84/12* (2009.01)
*H04W 88/04* (2009.01)

(52) U.S. Cl.
CPC ....... *H04W 48/18* (2013.01); *H04W 52/0209* (2013.01); *H04W 76/15* (2018.02); *H04W 84/12* (2013.01); *H04W 88/04* (2013.01); *Y02D 70/00* (2018.01); *Y02D 70/10* (2018.01); *Y02D 70/12* (2018.01); *Y02D 70/122* (2018.01); *Y02D 70/126* (2018.01); *Y02D 70/1242* (2018.01); *Y02D 70/1262* (2018.01); *Y02D 70/14* (2018.01); *Y02D 70/142* (2018.01); *Y02D 70/144* (2018.01); *Y02D 70/166* (2018.01); *Y02D 70/20* (2018.01); *Y02D 70/21* (2018.01); *Y02D 70/22* (2018.01); *Y02D 70/26* (2018.01)

(58) Field of Classification Search
CPC . H04W 52/0209; H04W 84/12; H04W 88/04; Y02D 70/20; Y02D 70/26; Y02D 70/14; Y02D 70/142; Y02D 70/22; Y02D 70/21; Y02D 70/00; Y02D 70/12; Y02D 70/1262; Y02D 70/144; Y02D 70/122; Y02D 70/126; Y02D 70/1242; Y02D 70/10; Y02D 70/166
See application file for complete search history.

(56) References Cited

U.S. PATENT DOCUMENTS

| | | |
|---|---|---|
| 2012/0163301 A1 | 6/2012 | Jang |
| 2013/0023301 A1 | 1/2013 | Wang et al. |
| 2014/0219194 A1* | 8/2014 | Varoglu ............... H04W 36/14 370/329 |
| 2014/0254471 A1* | 9/2014 | Fang ................... H04W 84/047 370/315 |
| 2015/0341450 A1* | 11/2015 | Reunamaki ............. H04L 67/18 705/14.58 |
| 2015/0350964 A1 | 12/2015 | Lin et al. |
| 2016/0330676 A1* | 11/2016 | Thangarasa ........... H04W 48/20 |
| 2017/0027016 A1* | 1/2017 | Suga ................... H04W 76/026 |

FOREIGN PATENT DOCUMENTS

| | | |
|---|---|---|
| CN | 105282799 A | 1/2016 |
| KR | 101114701 B1 | 6/2012 |
| WO | 2015115966 A2 | 8/2015 |

OTHER PUBLICATIONS

"3GPP TR 22.861, 3rd Generation Partnership Project; Technical Specification Group Services and System Aspects; Feasibility Study on New Services and Markets Technology Enablers for Massive Internet of Things; Stage 1 (Release 14)", V14.0.0, Jun. 2016, 28 pages.

3GPP TS 22.278, 3rd Generation Partnership Project; Technical Specification Group Services and System Aspects; Service requirements for the Evolved Packet System (EPS) (Release 14), V 14.0.0, Jun. 2016, 48 pages.

Raghothaman, et al., "System Architecture for a Cellular Network with Cooperative Mobile Relay", 2011 IEEE Vehicular Technology Conference, Sep. 5-8, 2011, 5 pages.

Qualcomm Inc., et al., "New SI: Further Enhancements LTE Device to Device, UE to Network Relays for Wearables", 3GPP TSG RAN Meeting #71, Agenda 10.1.2, RP-160677, Gothenburg, Sweden, Mar. 7-10, 2016, 7 pages.

Nokia, et al., "Revised WID: Remote UE access via relay UE", 3GPP TSG-SA WG1 Meeting #74, S1-161606, Agenda 7.7, Venice, Italia, May 9-13, 2016, 6 pages.

"WID on Remote UE access via relay UE", 3GPP TSG SA Meeting #72, SP-60511, Agenda 14.15, Busan, Republic of Korea, Jun. 15-17, 2016, 6 pages.

Huawei et al., "Description of Smart Wearable (PAN) family in MIoT TR," 3GPP TSG-SA WG1 Meeting #72, S1-154169, 8.2 FS_SMARTER-mIoT: Study on New Services and Markets Technology, Nov. 16-20, 2015, 4 pages, Anaheim, USA.

* cited by examiner

SYSTEM AND METHOD FOR EFFICIENT CONNECTION SETUP AND COMMUNICATION FOR POWER CONSCIOUS DEVICES

This application claims the benefit of U.S. Provisional Application No. 62/374,640, filed on Aug. 12, 2016, entitled "System and Method for Efficient Relay Solutions for Power Conscious Devices," which application is hereby incorporated herein by reference.

TECHNICAL FIELD

The present invention relates generally to a system and method for digital communications, and, in particular embodiments, to a system and method for efficient connection setup and communication for power conscious devices.

BACKGROUND

Power consumption is a key consideration in devices that are battery powered. A design criterion for a battery powered device is to minimize power consumption to extend the period of time between battery recharges or replacement as much as possible. In some deployments, such as remotely located sensors, battery replacement may be both impractical as well as expensive. Even in situations where the battery powered device is readily accessible and recharging is easy, such as in cellular telephones, tablets, laptop computers, wearable devices (WDs) including smart watches or virtual reality equipment, and so on, recharging the battery of a battery powered device is still an inconvenient and time consuming task.

Device discovery and connection establishment for discovered devices are typically power intensive processes. Establishing a connection for a device may involve a discovery phase where a device searches for neighboring devices, as well as a connection setup phase where a pair of devices exchange transmissions to establish a connection between the pair of devices. These phases are distinct from a data exchange phase that takes place over the connection, which may occur only after connection establishment has completed, or which may use a communication technology that differs from that used during discovery or connection setup phases. Connection establishment may consume a significant amount of power, as well as resources, especially in situations where many connections need to be established or repeatedly established.

SUMMARY

Example embodiments provide a system and method for efficient solutions for flexibly staging different technologies with different phases of device discovery, connection setup, and data communications between remote wearable devices and the peer (relay) devices or network equipment.

In accordance with an example embodiment, a method for establishing a radio connection is provided. The method includes selecting, by a first device, a first radio access technology for a first phase of a multi-phase radio connection establishment process, for example, to minimize power consumption or enable flexible peer device discovery and connection setup for future relay or direct (generally, higher speed) data communications at a remote device, and participating, by the first device, in the first phase of the multi-phase radio connection establishment process.

In accordance with an example embodiment, the method also enables establishing and using a radio connection using the first radio access technology that is selected independently from a selection of a second radio access technology used in a second phase of the multi-phase radio connection establishment process, wherein the second phase may be relayed or direct data communications over the established connection in the first phase between the wearable device and its peer (relay) devices or network equipment.

In accordance with an example embodiment, a first device adapted to establish a radio connection is provided. The device includes a processor, and a computer readable storage medium storing programming for execution by the processor. The programming including instructions to configure the first device to select a first radio access technology for a first phase of a multi-phase radio connection establishment process to, for example, minimize power consumption at a remote device, and participate in the first phase of the multi-phase radio connection establishment process.

In accordance with an example embodiment, a non-transitory computer-readable medium storing programming for execution by a processor is provided. The programming including instructions to select a first radio access technology for a first phase of a multi-phase radio connection establishment process to minimize power consumption at a remote device, and participate in the first phase of the multi-phase radio connection establishment process.

Practice of the foregoing embodiments enables different radio access networks or radio access techniques to be used in different stages of connection establishment and data communications over the established connection to make the stages more efficient, e.g., in terms of resource and/or power efficiency.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

Figure 1:
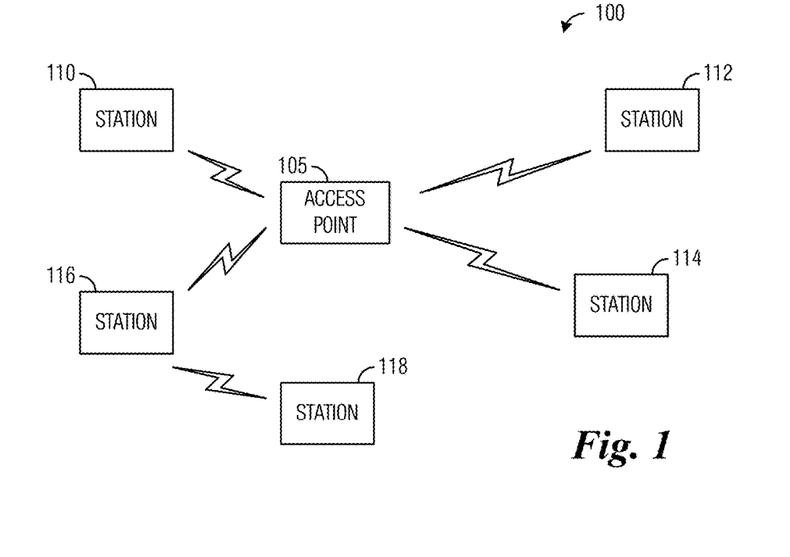
FIG. 1 illustrates an example communications system according to example embodiments described herein.

FIG. 1 illustrates an example communications system 100. Communications system 100 includes an access point (AP) 105 that is serving a plurality of stations, such as stations 110, 112, 114, and 116. In a first operating mode, commonly referred to as infrastructure-based communications mode or Wireless LAN (WLAN) mode, access point 105 controls certain aspects (such as such as radio frequency channel, transmission power limit, authentication, security, etc.) of communications with or among its associated stations. Generally speaking, in communications system 200, wireless resources for both uplink (station to access point) and downlink (access point to station) transmissions are accessed by transmitters based on a distributed contention mechanism commonly referred to as carrier sensing multiple access with collision avoidance (CSMA/CA). However, access point 210 still may influence the resource allocation by assigning different access priorities to stations and/or traffic types, and when succeeding in channel contention, by explicitly allocating certain time periods for certain stations and/or traffics or for special purposes, such as a Quiet Period during which time no transmitter may transmit.

In a second operating mode, commonly referred to as a direct communications mode, ad-hoc mode, or peer-to-peer mode, stations (such as station 116 and station 118) act as peer stations and may communicate directly with one another without going through a centralized entity such as access point 105. Examples of such direct communications include Wi-Fi Direct and neighbor awareness networking (NAN) compliant communications systems, both of which are specified by the Wi-Fi Alliance based on the IEEE 802.11 Standards.

While it is understood that communications systems may employ multiple access points capable of communicating with a number of UEs, only one access point and five stations are illustrated for simplicity.

Figure 2:
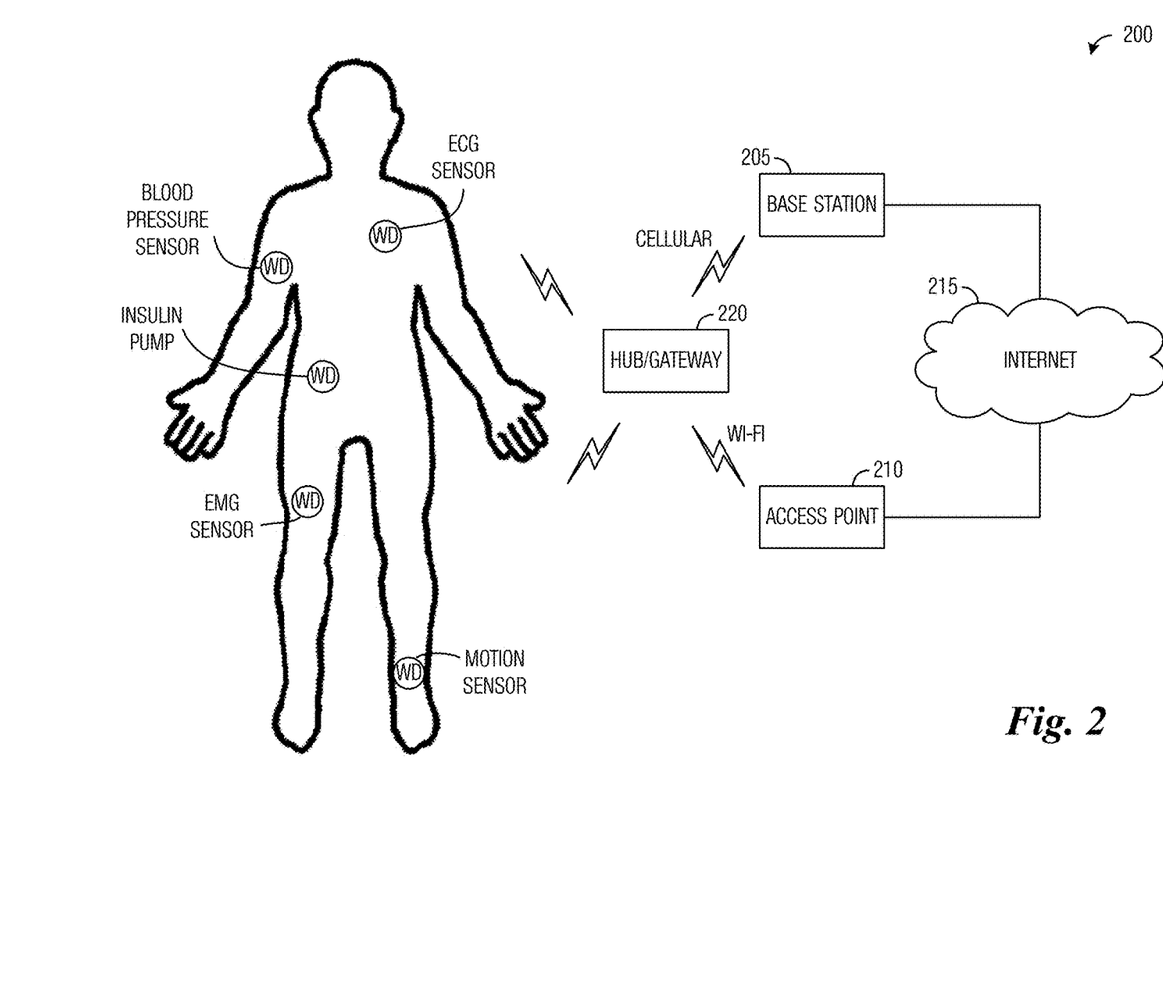
FIG. 2 illustrates an example communications system highlighting (relayed) wearable devices according to example embodiments described herein.

FIG. 2 illustrates an example communications system 200 highlighting wearable devices (WDs). Communications system 200 includes a base station 205 and/or an access point 210 connected to the Internet 215. The connection between the Internet 215 and base station 205 or access point 210 is typically based on wire-line networks over twisted pair, coaxial cable, and/or optical fiber, etc. Communications system 200 also includes a hub device (or gateway device) 220 that is also connected to the Internet 215 through either or both base station 205 and access point 210.

The connection between hub device 220 and base station 205 is typically based on a public land mobile network (PLMN) using a cellular radio technology such as a Third Generation Partnership Project (3GPP) High Speed Packet Access (HSPA) or Long Term Evolution (LTE), Global System for Mobile Communication (GSM), and so on, and is typically used when hub device 220 is disconnected from a local area network (LAN), such as one installed at the user's home or office. In such a case, hub device 220 may usually be a smartphone or a radio device installed in a car, bus, train, light rail, airplane, and so on. The connection between hub device 220 and access point 210 is normally based on a local area network either using a short range radio technology (such as IEEE 802.11, Bluetooth, or IEEE 802.15.4) or using a wire-line technology (for example, over twisted pair, cable, or power line), and is generally used when hub device 220 is connected with a LAN, such as one installed at the user's home or office. In such a situation, hub device 220 may typically be a smartphone or a device either co-located or connected (e.g., using power line, twisted pair, cable, or a short-range radio such as IEEE 802.11, Bluetooth, and IEEE 802.15.4) with access point 210.

Communications system 200 also includes remote devices (RDs), such as sensors, Internet of Things (IoT) devices, WDs (including personal health devices (such as ECG sensor, blood pressure sensor, insulin pump, electromyography (EMG) sensor, and so on), activity monitor devices (such as motion sensors, heart rate sensors, body temperature sensors, and so on), information gadgets (such as smart watches, portable video players, portable music players, and so on), etc.). Hub device 220 provides connectivity for RDs, typically by using a short range radio technology such as IEEE 802.11, Bluetooth, and/or IEEE 802.15.4. Alternatively, hub device 220 may be a dedicated device deployed at a high density location to enable RDs to connect to the Internet 215. In such a situation, hub device 220 may be deployed by a home owner, an entity responsible for providing connectivity at the high density location, an operator of a communications system, a provider providing connectivity for pay, a communications system subscriber interested in providing connectivity for credits or discounts, or so on. Although the discussion presents numerous WDs as examples of RDs, RDs include more than just WDs. Other examples of RDs include sensors for security, location, safety, climate, inventory tracking, and so on, purposes, as well as devices that measure mechanical system performance, including heavy machinery monitors, automotive sensors, manufacturing plants, power plants, factories, and so forth. Therefore, the focus on WDs should not be construed as being limiting to either the scope or spirit of the example embodiments.

Many RDs, such as WDs devices, sensors, and IoT devices, operate on battery power. Therefore, it is desired that connection establishment for these devices have low power consumption requirements.

The establishment of a radio connection between two devices may involve an extensive amount of communications, which can consume a considerable amount of power and/or resources. Any inefficiency in the connection establishment procedure is compounded if the connections have to be repeatedly established. As an illustrative example, the establishment of a radio resource control (RRC) connection in 3GPP LTE involves the devices synchronizing, exchanging master information block (MIB) and multiple system information blocks (SIBs), participating in a random access procedure, RRC connection establishment, as well as Layer 3 and non-access stratum (NAS) signaling for authentication, security and bearer configuration.

When the establishment of the radio connection involves a relay device, such as a relay UE or a hub device, the connection establishment procedure becomes more complicated due to the presence of an additional device participating in the connection establishment procedure. In particular, before it can establish a radio connection with the network, the RD may be required to establish a connection with the relay device. The connection establishment with the relay device may be a separate procedure from the radio connection establishment procedure with the network, and as noted above, it may involve multiple message exchanges between the RD and the relay device. The exchanges between the RD and the relay device during the connection establishment between the RD and the relay device are in addition to the requirements of the subsequent connection establishment procedure to be performed between the RD and the network. Therefore, increasing the efficiency of the connection establishment procedure can help to improve the overall performance of power conscious devices.

According to an example embodiment, in a situation wherein a relay device is providing relay services to a RD and the network, a process is provided wherein a first radio connection between the relay device and the RD is performed using a first access technology and a second radio connection between the RD and the network is performed using a second access technology. The first access technology is selected to optimize power consumption at the RD.

According to an example embodiment, the process involved in the establishment of a radio connection involving a relay device is partitioned into multiple phases. Each of the phases in the establishment of the radio connection may occur using the same or different radio access networks (RANs) and/or radio access technologies (RATs).

Figure 3:
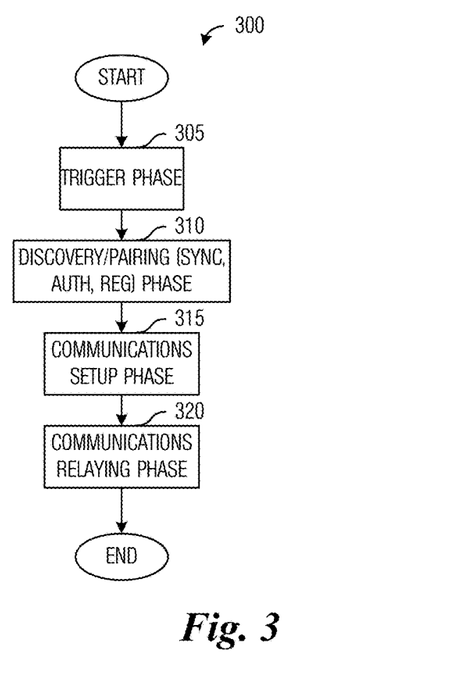
FIG. 3 illustrates a flow diagram of example operations occurring in the split phase establishment of a radio connection involving a relay device according to example embodiments described herein.

FIG. 3 illustrates a flow diagram of example operations 300 occurring in the split phase establishment of a radio connection involving a relay device. Operations 300 may be indicative of operations occurring during the establishment of a radio connection involving a relay device.

The establishment of a radio connection may be partitioned onto a plurality of phases. In trigger phase (block 305), service discovery is triggered. The trigger phase may be initiated by a device at either end of the connection (a relay device or a RD). The device triggering the service discovery may be triggered by a message from a RAN or core network (CN) to which the device is coupled. The message may be triggered by an arrival of traffic, specific service needs, specific technology or technical configuration, for example. The trigger phase may also be initiated by an application or a service discovery event originating at either end of the radio connection. The trigger phase may also be initiated by a lower layer radio condition change with respect to a specific working connectivity or cellular radio technology and therefore the need for re-discovery. The trigger phase may also be initiated by the occurrence of an event, including a mobility event, an initial power on or reset event, a wake-up event from a reduced power state, etc.

A service discovery/pairing phase (block 310), triggered as described above, involves the devices of the radio connection, e.g., the RD and the relay device, discovering each other or pairing with each other. Examples include synchronizing, authenticating, registering, and so on. The service discovery phase may involve an inquiry-inquiry scan (a first device transmits an inquiry and then listens for responses from a second device), an advertising scan (a first device transmits an advertisement of services that it is capable of supporting and a second device responds if the first device offers a desired service), a page-page scan (a first device enters a listen mode to listen for pages transmitted by a second device), a synchronization scan (a first device enters a listen mode to detect a synchronization signal transmitted by a second device), and so on. The service discovery phase may adopt mechanisms from a variety of RATs, including Bluetooth, Bluetooth Low Energy, IEEE 802.11 (Wi-Fi), 3GPP LTE Direct, 3GPP LTE Uu, and so on.

A communications setup phase (block 315) involves the setup of a radio connection between the devices (the relay device and the RD, for example). Any radio access technology compatible with the devices may be used to establish the connection. A communications relay phase (block 320) involves the relay device providing relaying services for the RD and a service or application to which the RD is connected. The communications setup phase may adopt mechanisms from a variety of RATs, including Bluetooth, Bluetooth Low Energy (BLE), IEEE 802.11 (Wi-Fi), 3GPP LTE Direct (LTE-D), 3GPP LTE Uu, and so on. The communications relay phase (block 320) may support communications between the RD and a network, for example, a cellular network. The supported communications may include messaging for control procedures, e.g., the establishment of a radio connection, RRC connection, or signaling connection between the RD and the network.

According to 3GPP TR 22.861 V2.00, which is hereby incorporated herein by reference, a 3GPP compliant communications system shall support a device to access the 3GPP network in direct 3GPP connection mode, meaning that the device and the 3GPP network communicate directly over the air. The 3GPP compliant communications system shall additionally support a device to access the 3GPP network indirectly via a relay UE when the device and the relay UE can communicate in direct device connection mode. This form of indirect communication is also referred to as indirect 3GPP connection mode. The 3GPP compliant communications system shall optimize the battery consumption of a device, whether the device is in direct 3GPP connection mode or in indirect 3GPP connection mode. The 3GPP compliant communications system shall identify, address, and reach a device, when the device is in indirect 3GPP connection mode.

According to 3GPP SP-1605n, 3GPP S1-161606, and 3GPP RP-160677, which are hereby incorporated herein by reference, the communications between an evolved proximity services (ProSe) remote UE and an evolved ProSe UE-to-Network relay is to use either evolved universal mobile telecommunications system (UMTS) terrestrial radio access (E-UTRA) or wireless LAN (WLAN). The 3GPP compliant communications system supports a user traffic session of an evolved ProSe remote UE to be relayed to the network via an evolved ProSe UE-to-Network relay. It is noted that the evolved ProSe remote UE has the functionality to directly connect to the evolved packet core (EPC) without a relay. Lower power consumption and lower complexity are aspects of the evolved ProSe remote UE. Consideration of efficient use of 3GPP LTE radio spectrum is provided, especially when shared between in-coverage and out-coverage evolved ProSe remote UEs. Other communications technologies, e.g. Bluetooth, can also be considered as candidates for communication between the remote device (e.g., ProSe remote UE) and the relay device (e.g., ProSe UE-to-Network relay).

Figure 4:
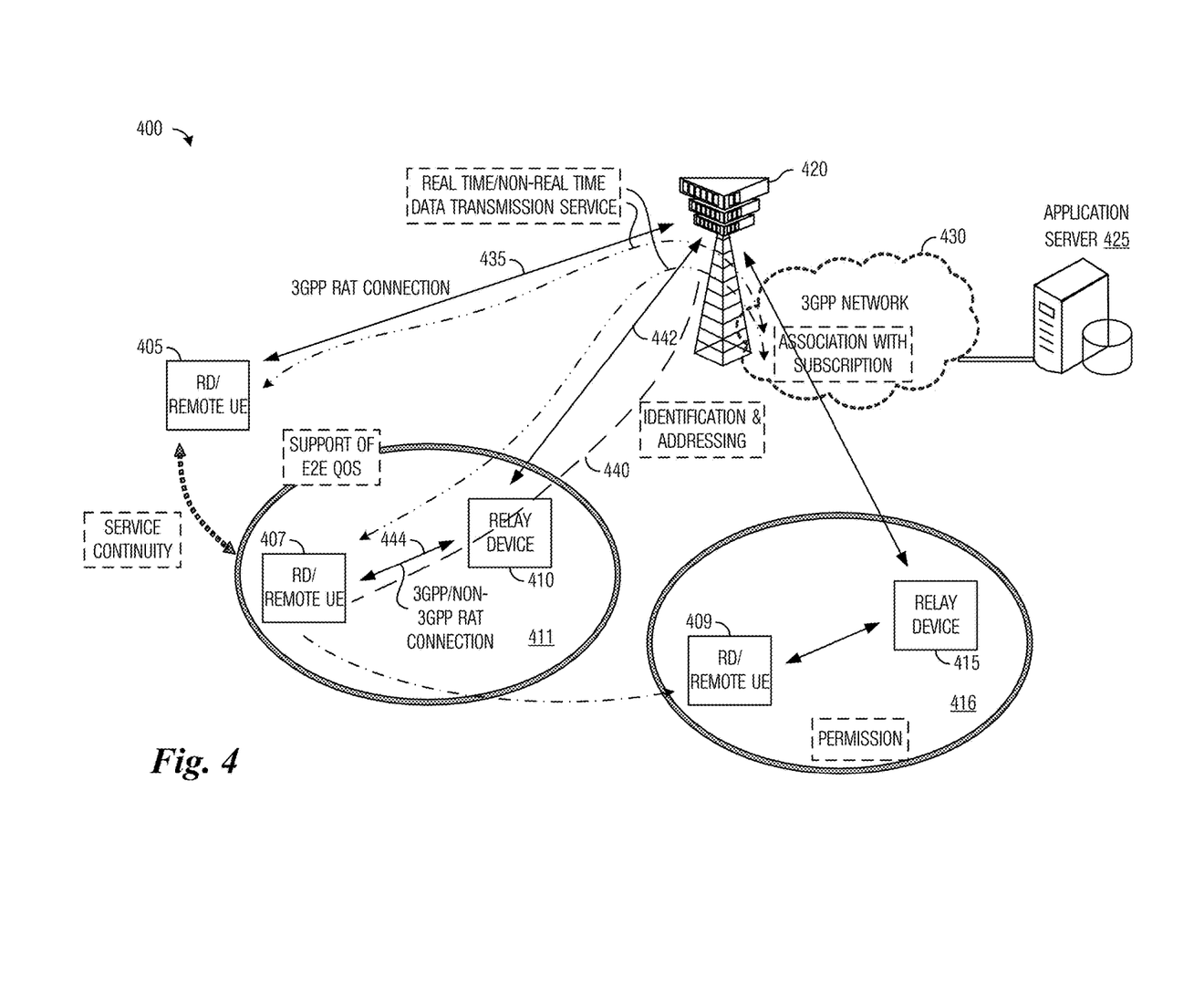
FIG. 4 illustrates a communications system highlighting different connection types involving a remote device (RD) according to example embodiments described herein.

FIG. 4 illustrates a communications system 400 highlighting different connection types involving a RD. Communications system 400 includes a RD 405. As shown in FIG. 4, RD 405 is mobile and is capable of direct communications with an access node 420 or relayed communications with access node 420. Access node 420 may also be referred to as a base station, access point, NodeB, evolved NodeB (eNB), gNodeBs (gNBs), master NodeB (MeNB) or master gNBs (MgNBs), secondary NodeB (SeNB) or secondary gNBs (SgNBs), and so on. Through the connection (either direct or relayed), RD 405 is capable of participating in communications with an application server 425 by way of a network 430.

A direct connection 435, supported by a 3GPP RAT, for example, enables real time and/or non-real time data communications between RD 405 and application server 425.

As RD 405 moves, it may encounter a relay device 410 with coverage area 411. It is noted that RD 405 is shown as RD 407 while in coverage area 411 to avoid confusion. While in coverage area 411, RD 407 may communicate with access node 420 via an indirect connection 440, comprising a first connection 442 between relay device 410 and access node 420 and a second connection 444 between relay device 410 and RD 407. First connection 442 may be a 3GPP RAT connection, while second connection 444 may be a 3GPP RAT or non-3GPP RAT connection (depending upon the RATs supported by both RD 407 and relay device 410. A similar situation may occur when RD 405 moves into coverage area 416 of relay device 415 (where RD 405 is now referred to as RD 409 to avoid confusion).

According to an example embodiment, the phases of the radio connection establishment process are each performed using a RAT and/or RAN that optimizes power consumption. The selection of RAT and/or RAN associated with each phase of the radio connection establishment process is made in accordance with one or more selection criteria of the devices of the radio connection. The selection criteria may be specific to a particular phase of the radio connection or common to multiple phases. The selection of the RAT and/or RAN associated with each phase may be automatic, intelligent, and dynamic in nature. Examples of the selection criteria include device capability, device setup, operating scenario, mobility scenario, serving history, service type, service requirements, quality of service (QoS) requirements, RAT and/or RAN condition, RAT and/or RAN load, and so on.

Figure 5:
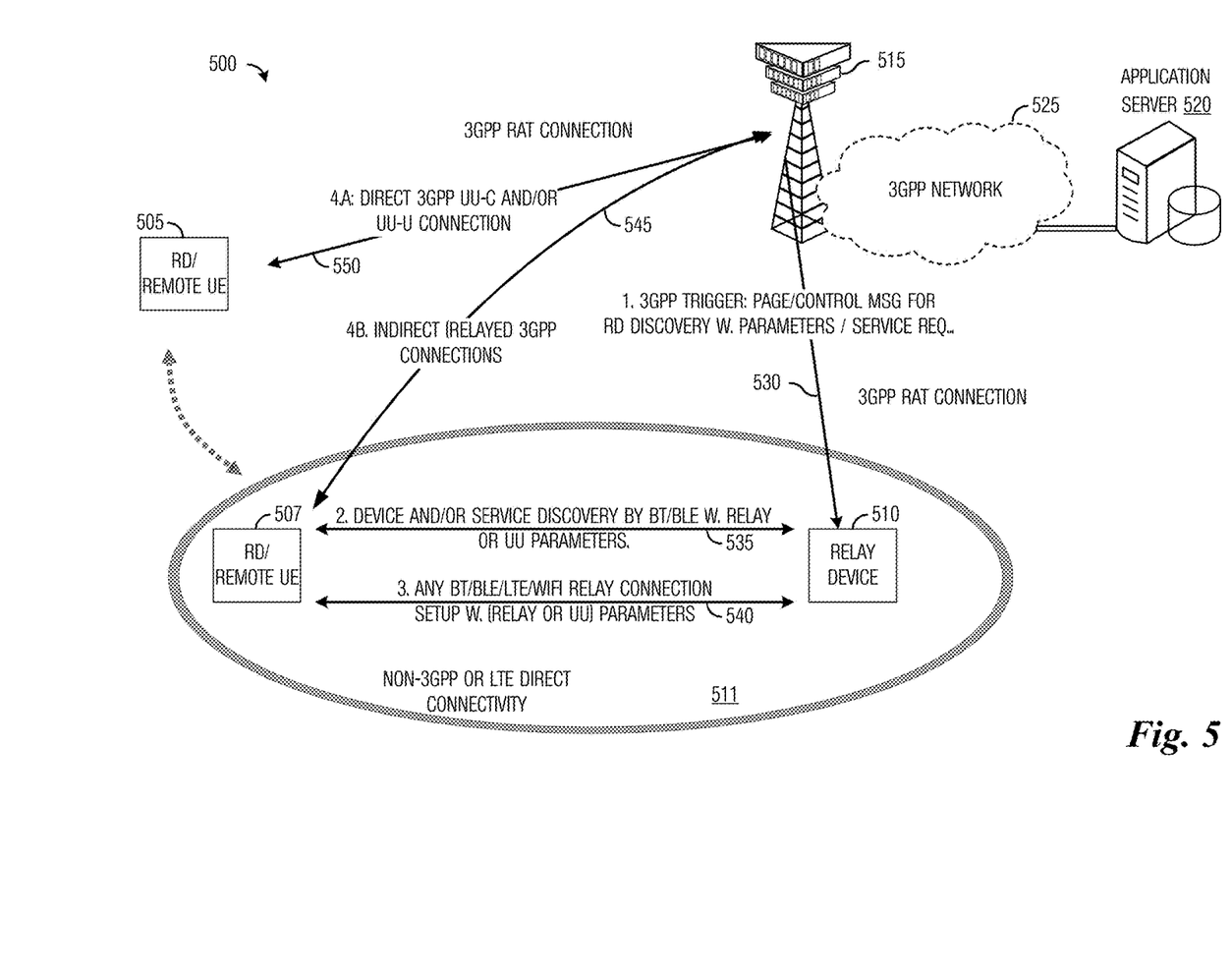
FIG. 5 illustrates a communications system highlighting the establishment of a radio connection utilizing split phases and a first example combination of RATs and/or RANs according to example embodiments described herein.

FIG. 5 illustrates a communications system 500 highlighting the establishment of a radio connection utilizing split phases (where "split" means that the phases are performed using potentially disparate RATs and/or RANs) and a first example combination of RATs and/or RANs. Communications system 500 includes a RD 505. As shown in FIG. 5, RD 505 is mobile and is capable of direct communications with an access node 515 and/or relayed communications with access node 515 through a relay device 510. Through the connection (either direct or relayed), RD 505 is capable of participating in communications with an application server 520 by way of a network 525.

As RD 505 moves, it may encounter relay device 510 with coverage area 511. It is noted that RD 505 is shown as RD 507 while in coverage area 511 to avoid confusion. While in coverage area 511, a radio connection between RD 507 and relay device 510 may be established. As shown in FIG. 5, a trigger phase is initiated by a 3GPP trigger transmitted over a 3GPP RAT connection by access node 515 (event 530). The 3GPP trigger may be a page and/or a control message for RD discovery and may include parameters associated with RD 507 or a service request. The 3GPP trigger may cause relay device 510 to begin a process to discover nearby RDs, including RD 507, in order to initiate RD to relay device communications. As an alternative, a relay device or a RD may initiate the trigger phase when a direct 3GPP connection is present. As another alternative, cellular paging may be directed towards a RD over a 3GPP RAT connection to instruct the RD to begin the trigger phase.

Relay device 510 performs device and/or service discovery phase (event 535). As an example, relay device 510 uses Bluetooth and/or BLE with relay or Uu parameters to perform generic access profile (GAP) based discovery, e.g., an inquiry-inquiry scan or advertising scan, a Bluetooth page-page scan, a BLE scan for synchronization, or so on, as well as pairing for authentication. If needed, an attribute protocol (ATT) and/or generic ATT (GATT) based or service discovery protocol (SDP) service discovery is also performed. Information related to cellular synchronization, cellular capability, or relevant RAT may also be included in information exchanged during the discovery phase.

RD 507 and relay device 510 participate in connection setup phase (event 540). The connection between RD 507 and relay device 510 may utilize any RAT (3GPP or non-3GPP) supported by both RD 507 and relay device 510. As an example, LTE-D is used for the connection between RD 507 and relay device 510. In order to help conserve time and/or power, message exchanges using an alternative RAT, such as Bluetooth or BLE, may be used during the connection setup phase. The device discovery phase and the connection setup phase may be separated from one another in terms of timing and RAT, thereby enabling flexibility and different RAT combinations in the two phases. As an example, service discovery phase may use a different RAT for discovery purposes.

An indirect connection (e.g., a relayed 3GPP connection) is established between RD 507 and access node 515 (event 545). The indirect connection is established using assistance from messages exchanged during trigger phase, device discovery phase, and connection setup phase.

If RD 505 is not in coverage area of a relay device, such as coverage area 511 of relay device 510, a direct 3GPP connection is established between RD 505 and access node 515 (event 550). Examples of direct 3GPP connections include 3GPP RRC connections and/or 3GPP Uu connections. A choice regarding the setup of an indirect connection or a direct connection may be made at any time in practice and may be based on the needs of RD 505 and/or relay device 510. In one example embodiment, a direct connection may be a narrow band IoT (NB-IoT) category M2 connection, as an example.

Figure 6:
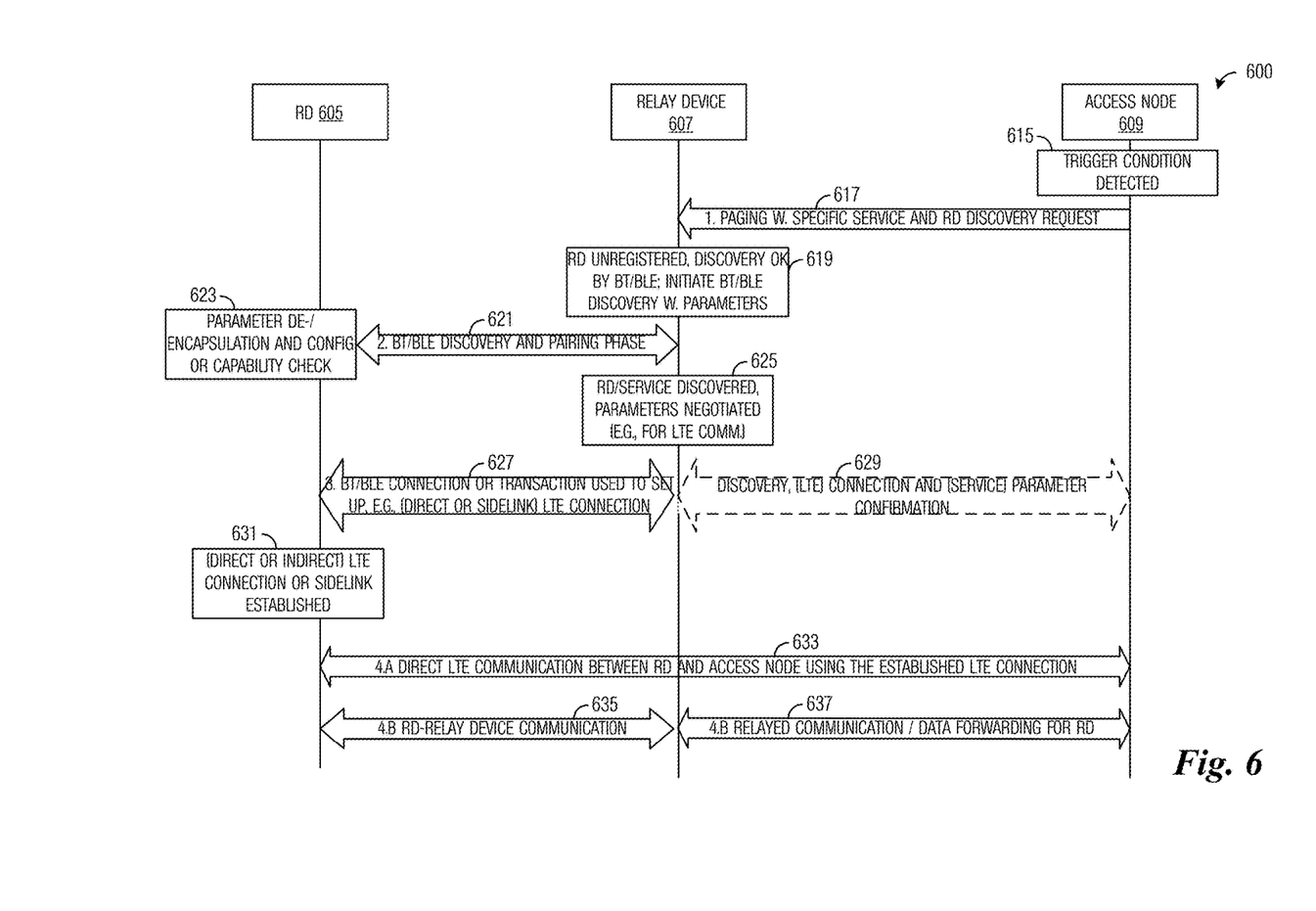
FIG. 6 illustrates a diagram of messages exchanged and processing performed by devices participating in the establishment of a radio connection utilizing split phases and the first example combination of RATs and/or RANs according to example embodiments described herein.

FIG. 6 illustrates a diagram 600 of messages exchanged and processing performed by devices participating in the establishment of a radio connection utilizing split phases and the first example combination of RATs and/or RANs. Diagram 600 displays messages exchanged and processing performed by a RD 605, a relay device 607, and an access node 609 (which is representative of a network entity). The ordering of the events and blocks shown in FIG. 6 may be shuffled or reordered.

Access node 609 detects a trigger condition (block 615). The trigger condition may include a mobility event of RD 605. Alternatively, the trigger event may be an application associated with RD 605 asserting a need to communicate with RD 605. Access node 609 initiates a trigger phase of the establishment of the radio connection (event 617). As an illustrative example, access node 609 transmits a 3GPP trigger, such as a page and/or control message, to relay device 607. The 3GPP trigger may specify a specific service and a RD discovery request, for example. Relay device 607 determines that there is an unregistered RD, i.e., RD 605, and that discovery is permissible (block 619). If so, relay device 607 initiates the discovery phase (also block 619), which normally also includes the pairing phase (utilizing Bluetooth or BLE, for example) as shown in event 621. Alternatively, not shown here, relay device 607 may find that RD 605 is already registered, e.g., from records of previous discovery procedure(s) between the two devices. Hence the discovery phase (e.g., beaconing and scanning) is not needed but only the pairing phase is, including operations between RD 605 and relay device 607 for synchronization, authentication, and re-registration, etc. As an illustrative example, relay device 607 uses Bluetooth or BLE discovery techniques, such as those discussed previously, to perform device discovery. The device discovery makes use of parameters provided by access node 609 in the 3GPP trigger, for example. In an alternative example embodiment, RD 605 may trigger the radio connection establishment through the discovery of relay devices.

Remote device 607 and RD 605 exchange messages to perform device discovery and pairing (event 621). A power efficient RAT may be used to perform device discovery. As an illustrative example, remote device 607 and RD 605 exchange Bluetooth or BLE messages while performing device discovery. The RAT used in device discovery may be requested by access node 609 or automatically selected by RD 605 and relay device 607. RD 605 performs parameter de-encapsulation and/or encapsulation, as well as configuration and capability check (block 623). The messages exchanged by remote device 607 and RD 605 include the parameters provided by access node 609 and may be encapsulated based on the RAT used in device discovery. The encapsulation (and de-encapsulation) of information or data exchanged helps in the authentication of the devices because only devices having the information exchanged during device discovery will be able to properly perform encapsulation and de-encapsulation. Remote device 607 determines that RD 605 is discovered and connection parameters are negotiated and exchanged (block 625). As an illustrative example, although Bluetooth or BLE is used for device discovery, connection parameters for a 3GPP connection (e.g., 3GPP LTE) are negotiated and exchanged. In an alternative example embodiment, RD 605 may be already registered with relay device 607 or relay device 607 may elect to synchronize and pair with a registered RD instead of performing device discovery.

In connection setup phase, a radio connection between RD 605 and relay device 607 is established (event 627). A connection in a first RAT (already present between RD 605 and relay device 607) may be used to establish a connection in a second RAT (for the connection between RD 605 and access node 609). As an example, a Bluetooth or BLE connection and/or Bluetooth or BLE messages are used to set up a 3GPP LTE connection, e.g., a direct or indirect 3GPP LTE connection or a sidelink 3GPP LTE connection. The radio connection between RD 605 and relay device 607 may be connectionless or asynchronous connection-less (ACL) in nature, but the relay device 607 to RD 605 inquiry/advertisement message exchange does not need to be connectionless, with exception of the very first message. Additionally, the Bluetooth connection or BLE transaction may be used to convey information for direct, indirect, or sidelink 3GPP LTE communications between RD 605 and access node 609. Optionally, relay device 607 and access node 609 confirm device discovery, connection and parameters (event 629).

RD 605 determines that the radio connection is established between RD 605 and access node 609 (block 631). RD 605 may determine that a direct or indirect or sidelink 3GPP LTE connection is established, for example. If a direct 3GPP LTE connection is established, RD 605 and access node 609 is able to communicate directly (event 633). The communications between RD 605 and access node 609 may be accomplished using a Uu connection for any permissible 3GPP LTE connection category. If an indirect 3GPP LTE connection is established, relay device 607 relays communications between RD 605 and access node 609 (events 635 and 637). It is noted that the connection between RD 605 and relay device 607 and the connection between relay device 607 and access node 609 may use different RATs. Direct and indirect connections may be used for the same purpose or for complementary purposes and may be established in an independent manner, a sequential manner, or a mutually exclusive manner. The direct, indirect, or sidelink 3GPP LTE connections may be set up using messages that are encapsulated within relayed messages, e.g., using connectivity or LTE-D, instead of arriving at RD 605 in un-encapsulated form. The 3GPP LTE connections may be a mixture of split direct and indirect connections. With either configuration, newer messages are encapsulated by a different RAT, such as Bluetooth or BLE using ATT/GATT messages, with cellular capability exchange.

In a situation where a direct 3GPP LTE connection is established between RD 605 and access node 609, relay device 607 may still assist RD 605 through the established RD to relay device connection, as established in event 627, for example. As an illustrative example, relay device 607 assists in cellular Uu downlink synchronization by conveying downlink carrier information from relay device 607 to RD 605 over the relayed connection. As another illustrative example, relay device 607 assists in Uu uplink synchronization of RD 605 by performing random access channel (RACH) preamble pre-assignment. As yet another illustrative example, relay device 607 assists in RD-specific MIB/SIB decoding, and RRC signaling.

With the direct, indirect, or sidelink 3GPP LTE connections setup, RD 605 may use Wi-Fi, Bluetooth, or BLE for point-to-point (P2P) communications between RD 605 and relay device 607 and 3GPP LTE for relayed or direct cellular communications. If direct cellular communications is supported, Uu of 3GPP LTE or NB-IoT may be used. If relayed cellular communications is supported, LTE-D or PC5 sidelink or any non-3GPP connectivity link, along with the Uu connection of relay device 607, may be used. Relay device 607 may assist RD 605 for purposes of cellular context or RRC state maintenance through an established P2P connection.

Figure 7:
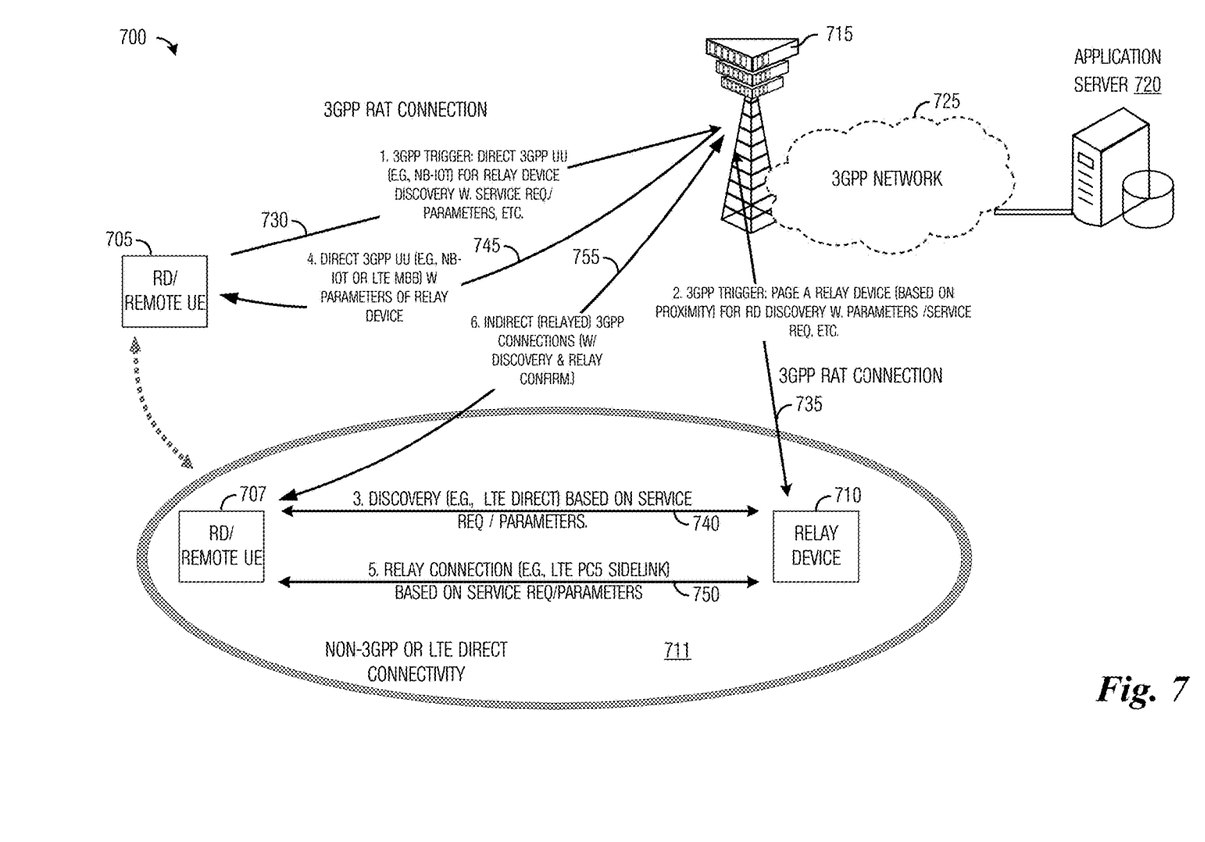
FIG. 7 illustrates a communications system highlighting the establishment of a radio connection utilizing split phases and a second example combination of RATs and/or RANs according to example embodiments described herein.

FIG. 7 illustrates a communications system 700 highlighting the establishment of a radio connection utilizing split phases and a second example combination of RATs and/or RANs. Communications system 700 includes a RD 705. As shown in FIG. 5, RD 705 is mobile and is capable of direct communications with an access node 715 and/or relayed communications with access node 715 through a relay device 710. Through the connection (either direct or relayed), RD 705 is capable of participating in communications with an application server 720 by way of a network 725. As shown in FIG. 7, RD 705 has no LTE connectivity but has LTE-D capability and a NB-IoT connection with low data-rate capabilities. When RD 705 has a need for a high data-rate connection, RD 705 triggers the establishment of a radio connection with access node 715, since no alternative connection is available to RD 705 at the moment. It is noted that although the NB-IoT radio connection is present, the NB-IoT radio connection may not be capable of supporting the data rate required. Moreover, if RD 705 enters the trigger phase without assistance from access node 715 excessive time and power consumption may result, e.g., due to the large search space used in a blind search for any available communication path. Furthermore, if RD 705 uses communications using the NB-IoT connection to perform communications with access point 715, excessive power consumption may result, due to excessive communications time caused by the low data rate, for example.

As RD 705 moves, it may encounter relay device 710 with coverage area 711. It is noted that RD 705 is shown as RD 707 while in coverage area 711 to avoid confusion. While in coverage area 711, a radio connection between RD 707 and relay device 710 may be established, supporting higher data-rate communications than the NB-IoT radio connection previously established between RD 705 and access node 715. As shown in FIG. 7, a trigger phase is initiated by a 3GPP trigger transmitted by RD 705 (event 730). As an illustrative example, RD 705 transmits the 3GPP trigger directly to access node 715 to request relay device discovery. The 3GPP trigger includes a service request, along with parameters, such as RD parameters, and so on. The 3GPP trigger may alternatively be transmitted between RD 707 and relay device 710, using LTE-D over the direct 3GPP PC5 interface, e.g., in a NB-IoT deployment, for example. Alternatively, instead of LTE-D, Wi-Fi Direct or a hybrid of LTE-D and Wi-Fi Direct may be used to transmit the 3GPP trigger. As another alternative, a power efficient D2D technology connection between RD 707 and relay device 710 may be used to assist in the setup of the high data rate radio connection. In yet another alternative, relay device 710 may initiate the trigger phase using any of the technologies discussed herein, such as LTE-D, Wi-Fi Direct, a power efficient D2D technology, Bluetooth, BLE, and so on.

Access node 715 transmits a 3GPP trigger (event 735) to relay device 710 using direct 3GPP communication. The 3GPP trigger may be a page and/or a control message for RD discovery and may include parameters associated with RD 707 (as provided by RD 705 in the 3GPP trigger initiating the trigger phase in event 730) or a service request. The 3GPP trigger may cause relay device 710 to begin a process to discover nearby RDs, including RD 707, in order to initiate RD to relay device communications. In an alternative example embodiment, the 3GPP trigger transmitted in event 730 and/or the 3GPP trigger transmitted in event 735 may be replaced with RD 707 directly discovering relay device 710 and then setting up an indirect connection with access node 715 through relay device 710.

Relay device 710 performs device and/or service discovery phase (event 740). As an example, relay device 710 uses LTE-D according to the service request or parameters to perform D2D discovery. RD 705 is notified by access node 715 regarding candidate relay devices (event 745). The notification from access node 715 may be transmitted over a direct 3GPP Uu interface (over NB-IoT in event 745, for example) and may include parameters associated with the candidate relay devices. RD 705 (e.g., RD 707 in the case of relay device 710) starts or responds to the D2D discovery using allocated resources. In an alternative example embodiment, event 745 may also form a high-speed direct 3GPP Uu data connection (over LTE MBB or mobile broadband, for example) as an alternative choice or BW aggregation candidate of the high-speed relay data connection established in event 750.

RD 707 and relay device 710 participate in connection setup phase (event 750). As an example, RD 707 and relay device 710 exchange messages to establish a 3GPP PC5 sidelink connection that is based on the service request or parameters. An indirect 3GPP connection (event 755) or a high-speed direct 3GPP connection (that is an alternative to or enhanced with respect to the radio connection used in event 730, which is shown in FIG. 7 in event 745 as an LTE MBB connection) is established between RD 707 and access node 715.

Figure 8:
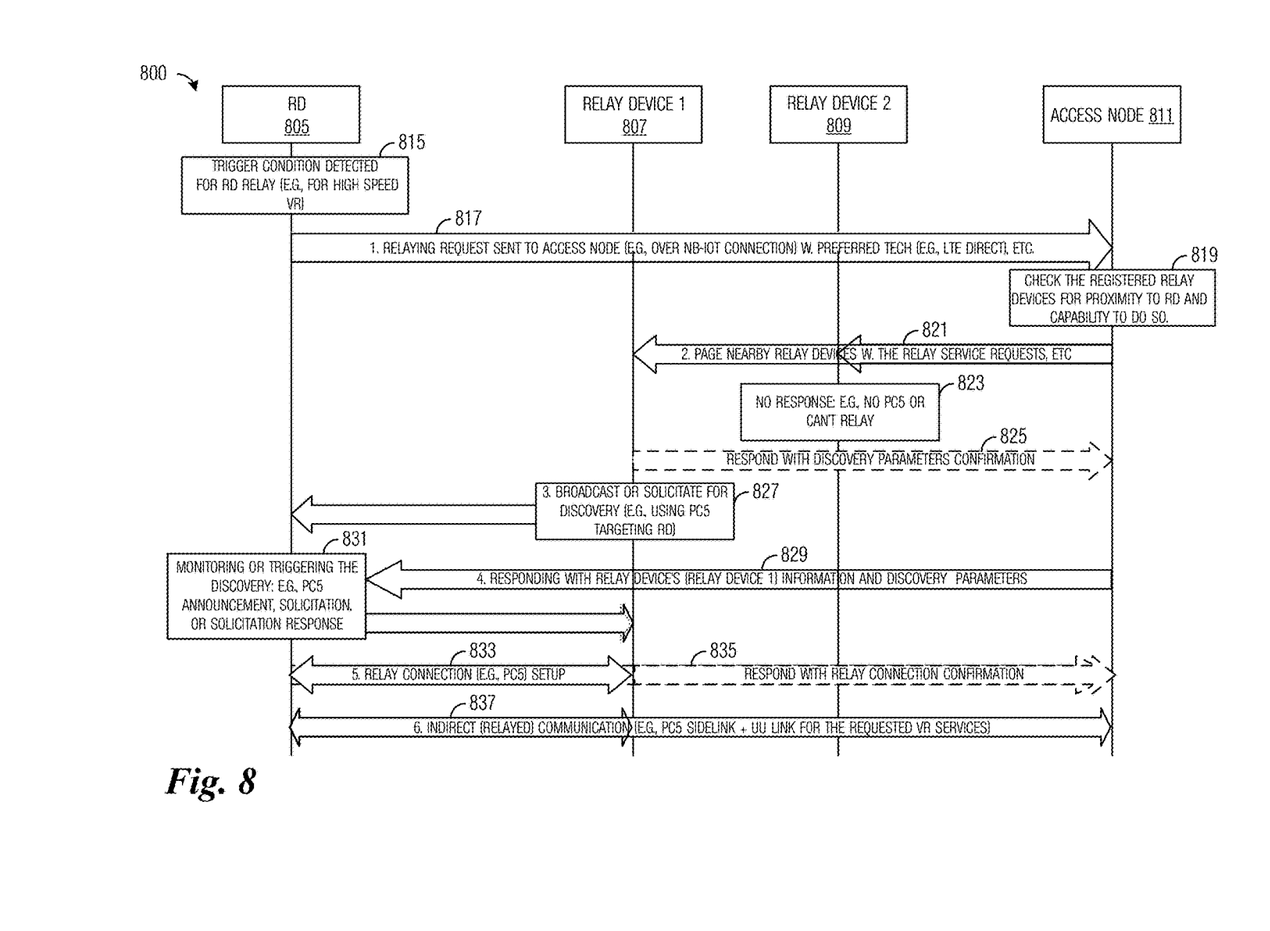
FIG. 8 illustrates a diagram of messages exchanged and processing performed by devices participating in the establishment of a radio connection utilizing split phases and a third example combination of RATs and/or RANs according to example embodiments described herein.

FIG. 8 illustrates a diagram 800 of messages exchanged and processing performed by devices participating in the establishment of a radio connection utilizing split phases and a third example combination of RATs and/or RANs. Diagram 800 displays messages exchanged and processing performed by a RD 805, a first relay device 807, a second relay device 809, and an access node 811 (which is representative of a network entity). The ordering of the events and blocks shown in FIG. 8 may be shuffled or reordered.

RD 805 detects a trigger condition (block 815). The trigger condition may include an application associated with RD 805 requiring a high data-rate connection, such as a virtual reality application, for example. RD 805 initiates a trigger phase by transmitting a relaying request to access node 811 (event 817). The relaying request may be transmitted over an NB-IoT connection, an LTE Uu connection, etc. It is noted that the NB-IoT connection may be power efficient for transmitting the relaying request, but it is not power efficient for meeting the requirements of the high data-rate connection, and may not be capable of meeting them at all. Access node 811 performs a check to determine if there are any known relay devices that are in the proximity of RD 805 and if they are capable of relaying for RD 805 (block 819). For discussion purposes, consider a situation where first relay device 807 and second relay device 809 are in the proximity of RD 805 and are capable of relaying for RD 805. Access node 811 pages first relay device 807 and second relay device 809 with relay service requests (event 821). The relay service request may include information about RD 805, the service that RD 805 is requesting, parameters associated with RD 805, and so on.

Although both first relay device 807 and second relay device 809 may be capable of providing relay services for RD 805, both may not actually provide relay services. As an example, the owner of second relay device 809 may refuse to allow second relay device 809 to provide relay services, the battery condition of second relay device 809 does not allow second relay device 809 to provide relay services, the capabilities of second relay device 809 does not meet the requirements of RD 805, and so on. Hence, second relay device 809 does not respond to the service request from access node 811 (block 823). However, first relay device 807 (or the owner thereof) is willing to provide relay services to RD 805 and responds to the service request from access node 811 with a confirmation (event 825). It is noted that even if access node 811 is able to find one or more relay devices for RD 805, situations may arise when none of the relay devices are capable or are willing to provide relay services.

First relay device 807 transmits or solicits for discovery purposes (block 827). As an example, first relay device 807 transmits using PC5 targeting RD 805. Access node 811 transmits information and discovery parameters about the relay devices that responded to the relay service request transmitted in event 821 (event 829), which in the example shown in FIG. 8, includes information and discovery parameters for first relay device 807. RD 805 performs device discovery in accordance with the information and discovery parameters provided by access node 811 (block 831). As an example, RD 805 monitors or triggers the device discovery, e.g., using a PC5 announcement, a solicitation, or a solicitation response. In the case of the announcement or solicitation response, RD 805 transmits to first relay device 807. The device discovery may be performed using a RAT, e.g., LTE sidelink, selected by RD 805 (signaled in event 817), or access node 811. Alternatively, the RAT may be automatically selected by RD 805 and access node 811. The PC5 based discovery shown herein may be initiated based on requests by either first relay device 807 or RD 805, supporting either Mode A or Mode B in LTE-D.

RD 805 and first relay device 807 exchange messages to set up a relay connection, e.g., a PC5 connection (events 833). First relay device 807 optionally transmits a relay connection confirmation response to access node 811 (event 835). The confirmation transmitted to access node 811, may alternatively be transmitted by RD 805 or by both RD 805 and first relay device 807. RD 805 and access node 811 communicate over an indirect connection through first relay node 807 (event 837). The indirect connection may include a PC5 sidelink and a Uu link for the requested service. It is noted that the parameters for service and/or service discovery exchanged in events 821, 829, and 833, as well as the broadcast or solicitation arising from block 827, may be conveyed all at once or communicated and negotiated over several iterations of handshaking between involved devices.

Figure 9:
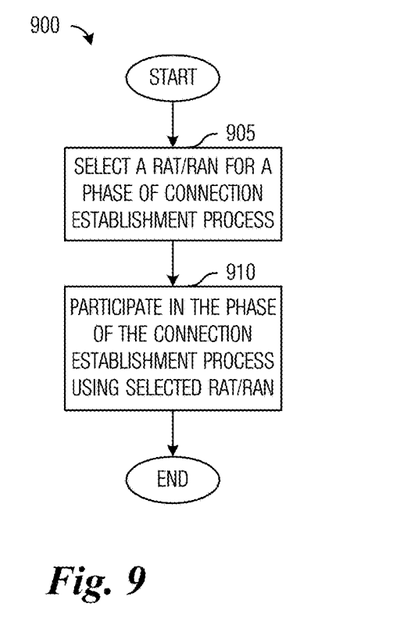
FIG. 9 illustrates a flow diagram of example operations occurring in a selection device participating in the establishment of a radio connection while providing power optimization during the radio connection establishment according to example embodiments described herein.

FIG. 9 illustrates a flow diagram of example operations 900 occurring in a selection device participating in the establishment of a radio connection while providing power optimization during the radio connection establishment. Operations 900 may be indicative of operations occurring in a selection device, such as a RD, a relay device, or an access node, as the selection device participates in the establishment of a radio connection.

Operations 900 begin with the selection device selecting a RAT and/or RAN for a phase of a radio connection establishment process, the selection of the RAT and/or RAN is performed to optimize power consumption at the devices involved and meet performance requirements of the radio connection (block 905). As discussed previously, the radio connection establishment process is a multiphase process, and the selection device is able to select the RAT and/or RAN for any of the phases of the process with which it participates. The power consumption at the RD is considered in the selection of the RAT and/or RAN. Additionally, the power consumption at the relay device may also be considered in the selection because power consumption is also a consideration at some relay devices. As an example, to support a high data-rate connection between the RD and a relay device, the selection device selects a LTE-D sidelink connection over an NB-IoT connection to optimize power consumption, as well as meet the performance requirements for the radio connection. Similarly, in a situation where a Bluetooth or BLE connection meets the performance requirements for the radio connection between the RD and the relay device, the selection device selects Bluetooth or BLE over 3GPP LTE to optimize power consumption at the RD (as well as potentially the relay device). The selection of the RAT and/or RAN may also be in accordance with the capabilities of the devices involved. As an example, the selection device will not select a RAT and/or RAN that is not supported by the devices involved. As another example, if the devices involved support multiple RATs and/or RANs that are good candidates, the selection device may select the RAT and/or RAN based on other considerations, such as interference to neighboring devices, operating environment condition, resistance to interference, and so on. The selection device participates in the phase of the radio connection establishment process (block 910).

Figure 10:
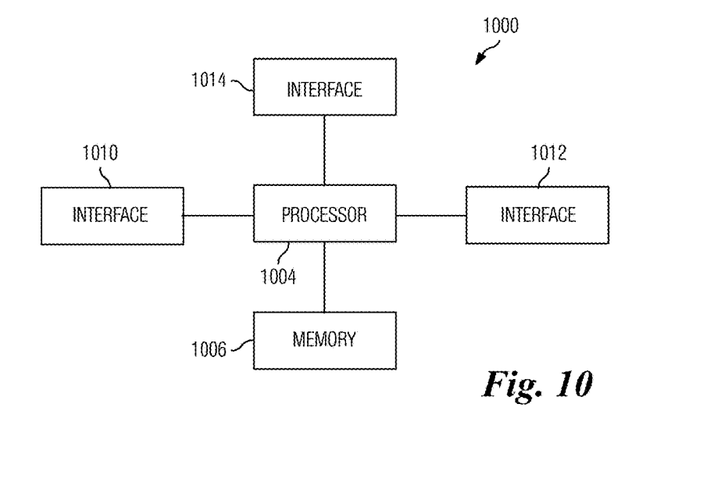
FIG. 10 illustrates a block diagram of an embodiment processing system for performing methods described herein.

FIG. 10 illustrates a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
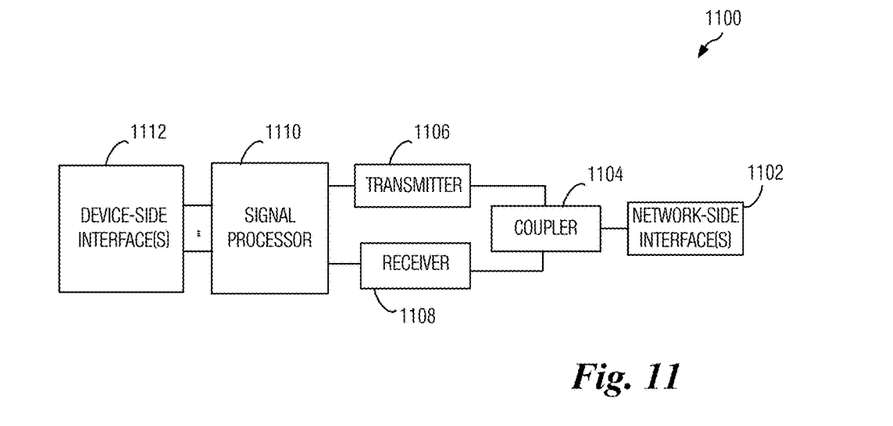
FIG. 11 illustrates a block diagram of a transceiver adapted to transmit and receive signaling over a telecommunications network according to example embodiments described herein.

In some embodiments, one or more of the interfaces 1010, 1012, 1014 connects the processing system 1000 to a transceiver adapted to transmit and receive signaling over the telecommunications network. FIG. 11 illustrates a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., downconverter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a selecting unit/module, a participating unit/module, and/or an exchanging unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for establishing radio connections, the method comprising:
    selecting, by a first device in a multi-phase radio connection establishment process for establishing a radio connection, a respective radio connection technology from a plurality of different radio connection technologies for use in each of at least two phases of a plurality of phases in the multi-phase radio connection establishment process, the plurality of phases being predetermined and comprising a discovery trigger phase, a device discovery phase, and a connection setup phase, wherein the first device participates in each of the at least two phases; and
    participating, by the first device, in a first phase of the at least two phases in the multi-phase radio connection establishment process using a first radio connection technology, wherein the first radio connection technology is selected by the first device for the first phase.

2. The method of claim 1, wherein the first radio connection technology is selected in accordance with at least a performance requirement of the radio connection, a service requirement for using the radio connection, a configuration for the radio connection, resource availability for the radio connection, power consumption of a device involved in the multi-phase radio connection establishment process, an instruction from a device that is already connected to the first device using a different technology, or a radio connection technology supported by the first device and another device participating in establishing the radio connection.

3. The method of claim 1, further comprising selecting, by the first device, a second radio connection technology from a plurality of radio connection technologies for a second phase of the multi-phase radio connection establishment process, wherein the second radio connection technology is selected independently from the first radio connection technology selected for the first phase of the multi-phase radio connection establishment process, or based at least in part on the first phase or the first radio connection technology.

4. The method of claim 3, wherein the first radio connection technology selected for the first phase of the multi-phase radio connection establishment process is different from the second radio connection technology selected for the second phase of the multi-phase radio connection establishment process.

5. The method of claim 3, wherein selection of the first radio connection technology in the first phase and selection of the second radio connection technology in the second phase occur sequentially or iteratively.

6. The method of claim 3, wherein the first radio connection technology or the second radio connection technology comprises a 3GPP Long Term Evolution (LTE) compliant technology, a 3GPP 5G new radio (NR) compliant technology, a 3GPP infrastructure-based technology involving a remote base station, a 3GPP point-to-point technology, an IEEE 802.11 compliant technology, a Wi-Fi compliant technology, an IEEE 802.11 or Wi-Fi infrastructure-based technology involving an access point, an IEEE 802.11 or Wi-Fi point-to-point technology, an IEEE 802.15 or Bluetooth compliant technology, an IEEE 802.15 or Bluetooth Low Energy (BLE) compliant technology.

7. The method of claim 1, wherein the plurality of phases of the multi-phase radio connection establishment process further comprise, an initial device discovery phase, an initial service discovery phase, a phase for discovering a second device, a phase for discovering service capability of the second device, a peer device or service pairing and authentication phase, a direct communication phase for communicating over the radio connection, or a relayed communication phase for communicating over the radio connection.

8. The method of claim 1, wherein participating in the first phase of the multi-phase radio connection establishment process comprises exchanging messages in accordance with the first radio connection technology.

9. The method of claim 1, wherein the radio connection is established between a second device and a third device through the first device as a relay, or the radio connection is established between the first device and the third device using the second device as a relay.

10. The method of claim 1, wherein selecting, by the first device, the respective radio connection technology from the plurality of different radio connection technologies for each of the at least two phases comprises selecting the respective radio connection technology for an initial service and device discovery phase when being triggered by an event or instructed by a second device that is already connected to the first device through a selected or configured radio connection technology.

11. A first device, comprising:
a processor; and
a computer readable storage medium storing programming for execution by the processor, the programming including instructions to configure the first device to:
select a respective radio connection technology from a plurality of different radio connection technologies for use in each of at least two phases of a plurality of phases in a multi-phase radio connection establishment process for establishing a radio connection, the plurality of phases comprising a discovery trigger phase, a device discovery phase, and a connection setup phase, wherein the first device participates in each of the at least two phases; and
participate in a first phase of the at least two phases in the multi-phase radio connection establishment process using a first radio connection technology, wherein the first radio connection technology is selected by the first device for the first phase.

12. The first device of claim 11, wherein the programming includes instructions to configure the first device to select the first radio connection technology in accordance with at least a performance requirement of the radio connection, a service requirement for using the radio connection, a configuration for the radio connection, resource availability for the radio connection, power consumption of a device involved in the multi-phase radio connection establishment process, an instruction from a device that is already connected to the first device using a different technology, or a radio connection technology supported by the first device and another device participating in establishing the radio connection.

13. The first device of claim 11, wherein the programming includes instructions to configure the first device to select a radio access network for the first phase, and wherein the first radio connection technology is selected independently from a second radio connection technology selected by the first device for a second phase of the at least two phases in the multi-phase radio connection establishment process.

14. The first device of claim 11, wherein the first device is a remote device, a relay device, or an access node.

15. The first device of claim 11, wherein the programming includes instructions to configure the first device to exchange messages in accordance with the first radio connection technology.

16. The first device of claim 11, wherein the first radio connection technology comprises a Third Generation Partnership Project (3GPP) compliant technology, or a non-3GPP compliant technology.

17. A non-transitory computer-readable medium storing programming for execution by a processor, the programming including instructions to:

select, for a first device in a multi-phase radio connection establishment process for establishing a radio connection, a respective radio connection technology from a plurality of different radio connection technologies for use in each of at least two phases of a plurality of phases in the multi-phase radio connection establishment process, each of the plurality of phases comprising an operation to be performed by a device using a radio connection technology during a corresponding phase, with the plurality of phases being predetermined for establishing the radio connection, and comprising a discovery trigger phase, a device discovery phase, a connection setup phase and a communication phase over the radio connection, wherein the first device participates in each of the at least two phases; and
participate in a first phase of the at least two phases in the multi-phase radio connection establishment process using a first radio connection technology, wherein the first radio connection technology is selected for the first phase.

18. The non-transitory computer-readable medium of claim 17, wherein the programming includes instructions to select the first radio connection technology in accordance with at least a performance requirement of the radio connection being established, a service requirement for using the radio connection, a configuration for the radio connection, resource availability for the radio connection, power consumption of a device involved in the multi-phase radio connection establishment process, an instruction from a device, or radio connection technologies supported by two devices participating in the first phase of the multi-phase radio connection establishment process.

19. The non-transitory computer-readable medium of claim 17, wherein the programming includes instructions to select a radio access network for the first phase of the multi-phase radio connection establishment process, and wherein the first radio connection technology is selected independently from a second radio connection technology selected for a second phase of the at least two phases in the multi-phase radio connection establishment process.

20. The non-transitory computer-readable medium of claim 17, wherein the non-transitory computer-readable medium is located in the first device that is a remote device, a relay device, or an access node.

21. The non-transitory computer-readable medium of claim 17, wherein the programming includes instructions to exchange messages in accordance with the first radio connection technology.

22. The non-transitory computer-readable medium of claim 17, wherein the first radio connection technology comprises a 3GPP Long Term Evolution (LTE) compliant technology, a 3GPP 5G new radio (NR) compliant technology, a 3GPP infrastructure-based technology involving a remote base station, a 3GPP point-to-point technology, an IEEE 802.11 compliant technology, a Wi-Fi compliant technology, an IEEE 802.11 or Wi-Fi infrastructure-based technology involving an access point, an IEEE 802.11 or Wi-Fi point-to-point technology, an IEEE 802.15 or Bluetooth compliant technology, an IEEE 802.15 or Bluetooth Low Energy (BLE) compliant technology.

* * * * *